(12) United States Patent
Farrington et al.

(10) Patent No.: US 7,787,261 B2
(45) Date of Patent: Aug. 31, 2010

(54) INTERMEDIATE BUS ARCHITECTURE WITH A QUASI-REGULATED BUS CONVERTER

(75) Inventors: Richard W. Farrington, Heath, TX (US); Martin F. Schlecht, Lexington, MA (US)

(73) Assignee: SynQor, Inc., Boxborough, MA (US)

( * ) Notice: Subject to any disclaimer, the term of this patent is extended or adjusted under 35 U.S.C. 154(b) by 296 days.

(21) Appl. No.: 11/982,327

(22) Filed: Nov. 1, 2007

(65) Prior Publication Data

US 2008/0211304 A1 Sep. 4, 2008

Related U.S. Application Data

(60) Provisional application No. 60/855,971, filed on Nov. 1, 2006.

(51) Int. Cl.
H02M 3/335 (2006.01)
(52) U.S. Cl. .......................... 363/17; 363/132
(58) Field of Classification Search ............ 363/16–20, 363/25, 131, 21.06, 95, 97
See application file for complete search history.

(56) References Cited

U.S. PATENT DOCUMENTS

| | | | |
|---|---|---|---|
| 3,663,941 A | 5/1972 | Pasciutti | |
| 4,438,411 A | 3/1984 | Rubin et al. | |
| 4,586,119 A | 4/1986 | Sutton | |
| 4,788,450 A | 11/1988 | Wagner | |
| 4,788,634 A | 11/1988 | Schlecht et al. | |
| 4,812,672 A | 3/1989 | Cowan et al. | |
| 5,019,954 A | 5/1991 | Bourgeault et al. | |
| 5,179,512 A | 1/1993 | Fisher et al. | |
| 5,274,543 A | 12/1993 | Loftus, Jr. | |
| 5,303,138 A | 4/1994 | Rozman | |

(Continued)

FOREIGN PATENT DOCUMENTS

EP  0 549 920 B1  7/1993

(Continued)

OTHER PUBLICATIONS

Mweene, L. Haachitaba, et al., "A High-Efficiency 1.5 kW, 390-50 V Half-Bridge Converter Operated at 100% Duty-Ratio," IEEE, 1992, pp. 723-730.

(Continued)

*Primary Examiner*—Rajnikant B Patel
(74) *Attorney, Agent, or Firm*—Hamilton, Brook, Smith & Reynolds, P.C.

(57) ABSTRACT

A dc-dc converter system comprises a quasi-regulated bus converter and plural regulation stages that regulate the output of the bus converter. The bus converter has at least one controlled rectifier with a parallel uncontrolled rectifier. A control circuit controls the controlled rectifier to cause a normally non-regulated mode of operation through a portion of an operating range of source voltage and a regulated output during another portion. The bus converter may be an isolation stage having primary and secondary transformer winding circuits. For the non-regulated output, each primary winding has a voltage waveform with a fixed duty cycle. The fixed duty cycle causes substantially uninterrupted flow of power during non-regulated operation. Inductors at the bus converter input and in a filter at the output of the bus converter may saturate during non-regulated operation.

27 Claims, 3 Drawing Sheets

U.S. PATENT DOCUMENTS

| | | | |
|---|---|---|---|
| 5,343,383 A | 8/1994 | Shinada et al. | |
| 5,396,412 A | 3/1995 | Barlage | |
| 5,442,534 A | 8/1995 | Cuk et al. | |
| 5,513,092 A | 4/1996 | Goebel | |
| 5,528,480 A | 6/1996 | Kikinis et al. | |
| 5,528,482 A | 6/1996 | Rozman | |
| 5,539,630 A * | 7/1996 | Pietkiewicz et al. | 363/17 |
| 5,621,621 A | 4/1997 | Lilliestrale | |
| 5,625,541 A | 4/1997 | Rozman | |
| 5,663,887 A | 9/1997 | Warn et al. | |
| 5,726,869 A | 3/1998 | Yamashita et al. | |
| 5,771,160 A | 6/1998 | Seong | |
| 5,774,350 A | 6/1998 | Notaro et al. | |
| 5,870,299 A | 2/1999 | Rozman | |
| 5,872,705 A | 2/1999 | Loftus, Jr. et al. | |
| 5,880,949 A | 3/1999 | Melhem et al. | |
| 5,959,370 A | 9/1999 | Pardi | |
| 5,999,417 A * | 12/1999 | Schlecht | 363/16 |
| 6,016,258 A | 1/2000 | Jain et al. | |
| 6,046,920 A | 4/2000 | Cazabat et al. | |
| 6,066,943 A | 5/2000 | Hastings et al. | |
| 6,088,329 A | 7/2000 | Lindberg et al. | |
| 6,222,742 B1 | 4/2001 | Schlecht | |
| 6,252,781 B1 | 6/2001 | Rinne et al. | |
| 6,487,093 B1 | 11/2002 | Vogman | |
| 6,504,267 B1 | 1/2003 | Giannopoulos | |
| 6,552,917 B1 | 4/2003 | Bourdillon | |
| 6,594,159 B2 | 7/2003 | Schlecht | |
| 6,700,365 B2 | 3/2004 | Isham et al. | |
| 6,728,118 B1 | 4/2004 | Chen et al. | |
| 6,731,520 B2 | 5/2004 | Schlecht | |
| 6,735,094 B2 | 5/2004 | Steigerwald et al. | |
| 6,853,568 B2 | 2/2005 | Li et al. | |
| 7,050,309 B2 | 5/2006 | Farrington | |
| 7,072,190 B2 | 7/2006 | Schlecht | |
| 7,269,034 B2 | 9/2007 | Schlecht | |
| 7,272,021 B2 | 9/2007 | Schlecht et al. | |
| 7,272,023 B2 | 9/2007 | Schlecht | |
| 2003/0174522 A1 | 9/2003 | Xu et al. | |
| 2005/0047177 A1 | 3/2005 | Tobita | |
| 2006/0209572 A1 | 9/2006 | Schlecht | |
| 2006/0262575 A1 | 11/2006 | Schlecht et al. | |
| 2006/0285368 A1 | 12/2006 | Schlecht | |

FOREIGN PATENT DOCUMENTS

| | | |
|---|---|---|
| EP | 1231705 A2 | 8/2002 |
| JP | 06315263 A | 11/1994 |
| WO | WO 88/09084 A1 | 11/1988 |

OTHER PUBLICATIONS

Mweene, Loveday Haachitaba, "The Design of Front-End DC-DC Converters of Distributed Power Supply Systems with Improved Efficiency and Stability," Thesis, Massachusetts Institute of Technology, Sep. 1992, pp. 1-184.

Casey, Leo Francis, "Circuit Design for 1-10 MHZ DC-DC Conversion," MIT Doctoral Thesis, Jan. 1989, pp. 1-216.

Ferencz, Andrew, "A 250 W High Density Point-of-Load Converter," MIT Master of Science Thesis, Sep. 1989, pp. 1-117.

Mohandes, Bijan, MOSFET Synchronous Rectifiers Achieve 90% Efficiency—Part I and Part II, PCIM, Jun. 1991, pp. 10-13 & 55-61.

Cobos, J.A., et al., "Resonant Reset Forward Topologies for Low Output Voltage On Board Converters," IEEE, 1994, pp. 703-708.

Tabisz, W.A., et al., "A MOSFET Resonant Synchronous Rectifier for High-Frequency DC/DC Converters," Proceedings of the Power Electronics Specialists Conference, San Antonio, TX, Jun. 10-15, 1990, pp. 295-305.

Wiegman, H.L.N., et al., "A Dual Active Bridge SMPS Using Synchronous Rectifiers," HFPC May 1990 Proceedings, pp. 336-346.

Shoyama, Masahito, et al., "Zero-Voltage-Switching Realized by Magnetizing Current of Transformer in Push-Pull Current-Fed DC-DC Converter," IEEE, 1993, pp. 178-184.

Shoyama, Masahito, et al., "Zero-Voltage-Switched Push-Pull DC-DC Converter," IEEE, 1991, pp. 223-229.

Xiao, Li, et al, "Soft Switched PWM DC/DC Converter With Synchronous Rectifiers," IEEE 1996, pp. 476-484.

Blanchard, Richard, et al., "The Design of a High Efficiency, Low Voltage Power Supply Using MOSFET Synchronous Rectification and Current Mode Control," IEEE, 1985, pp. 355-361.

Jitaru, Ionel Dan, et al, "High Efficiency DC-DC Converter," IEEE, 1994, pp. 638-644.

Harper, D.J., et al., "Controlled Synchronous Rectifier," HFPC May 1988 Proceedings, pp. 165-172.

Acker, Brian, et al., "Current-Controlled Synchronous Rectification," IEEE 1994, pp. 185-191.

Murakami, Naoki, et al., "A High-Efficiency 30-W Board Mounted Power Supply Module," IEEE 1991, pp. 122-127.

Casey, Leo F., et al., "A High Frequency, Low Volume, Point-of-Load Power Supply for Distributed Power Systems," IEEE 1987, pp. 439-450.

Schlecht, Martin F., "Research Results from the Study of A High Efficiency, Highly Manufacturable DC-DC Converter," unpublished, pp. 1-32.

Gachora, John Mburu, "Design of a Four-Phase Switchmode High Efficiency Power Supply," MIT Master of Engineering Thesis, 1994, pp. 1-66.

Blanchard R., et al., "MOSFETs Move In On Low Voltage Rectification," Official Proceedings of the Ninth International PCI '84 Conference, Oct. 29-31, 1984, pp. 213-222.

Garcia, O. et al., "Zero Voltage Switching In The PWM Half Bridge Topology With Complementary Control and Synchronous Rectification," Record of the Annual Power Electronics Specialist Conference, Pesc, Atlanta, Jun. 12-15, 1995, vol. 1, No. CONF. 26, Jun. 12, 1995, IEEE, pp. 286-291.

Texas Instruments, "200-W 48-V Input, 8-V Output, Semi-Regulated, Isolated DC-DC Bus Converter," PTQB425080, pp. 1-14, Dec. 2006, Revised Nov. 2007.

* cited by examiner

INTERMEDIATE BUS ARCHITECTURE WITH A QUASI-REGULATED BUS CONVERTER

RELATED APPLICATION

This claims the benefit of U.S. Provisional Application No. 60/855,971, filed on Nov. 1, 2006. The entire teachings of the above application are incorporated herein by reference.

BACKGROUND OF THE INVENTION

U.S. Pat. No. 5,999,417 (the '417 patent) and U.S. Pat. No. 7,050,309 (the '309 patent) describe what is here referred to as the "Intermediate Bus Architecture" and "bus converters." The entire teachings of these patents are incorporated herein by reference.

The Intermediate Bus Architecture (IBA) has become a popular approach for providing multiple output voltages (for loads such as digital circuits) from a single input voltage source. A first dc-dc converter (sometimes called a "bus converter"), usually providing isolation through a transformer, is used to change the source voltage, say 48V, to an intermediate voltage, say 12V. This intermediate voltage is then used as the input to several non-isolated dc-dc converters (sometimes called "P.O.L. converters," for "point-of-load") or linear regulators, each of which create a regulated output voltage appropriate for their respective loads.

When the range of the source voltage is narrow enough, the bus converter can be a device that normally does not regulate. It simply isolates and converts the source voltage to the intermediate voltage by virtue of the turns-ratio of its transformer. For instance, it may have a turns-ratio of 4:1, so that a 48V source becomes a 12V intermediate voltage. As the source voltage ranges from 38V to 56V, the intermediate voltage correspondingly ranges from 9V to 14V. This type of bus converter will be referred to herein as a "non-regulated bus converter."

Since the non-regulated bus converter does not normally regulate (it regulates only during a turn-on or turn-off transient, or during a current-limit condition, and the like), the intermediate voltage displays a "droop" characteristic. By this it is meant that the value of the intermediate voltage decreases as the current flowing out of the bus converter increases. For the example given above, this might make the intermediate voltage range from 8.5V to 14V over the full range of source voltage and bus converter output current.

This variation of the intermediate voltage is acceptable since the P.O.L.'s can typically operate over such a range of their input voltage.

When the range of the source voltage is wider, such as 36V to 75V, or even 36V to 100V, then a different type of bus converter is often used because the non-regulated bus converter would give too much variation in the intermediate voltage for the P.O.L.'s to handle. This second type of bus converter, referred to herein as a "semi-regulated bus converter," provides regulation (as well as isolation) so that the intermediate voltage does not vary proportionally to the source voltage. To first order it holds the intermediate voltage approximately constant, although it does permit this voltage to droop as the bus converter's output current increases so that some costs might be saved. For this reason, this type of bus converter is referred to as "semi-regulated." The droop in the intermediate voltage, which might be around 5% to 10% of the nominal voltage as the bus converter's output current ranges from zero to full rated current, is well within the range of what a typical P.O.L. can handle for its input voltage.

A semi-regulated bus converter has a lower level of performance, in terms of efficiency and power handling capability, than the non-regulated bus converter as a result of its design to provide regulation over the full range of the source voltage.

SUMMARY OF THE INVENTION

To address the problem of reduced performance of the bus converter for an application where the source voltage range is relatively wide, a new type of bus converter is presented here. This bus converter, herein called a "quasi-regulated bus converter," is normally non-regulating over some portion of the source voltage operating range, and regulating (either fully regulating or semi-regulating) over another portion of the operating range. The operating range is the intended source voltage range where the system is expected to operate and meet its specifications and is generally specified for each converter and/or for the application in which it is applied. Typically, the converter only receives a source voltage outside its operating range during a transient such as start up or shut down.

For instance, in a system where the input voltage ranges from 36V to 100V, the quasi-regulated bus converter might be designed so that it does not normally regulate when the source voltage is between 36V and 56V. If the transformer turns ratio is 4:1, the intermediate voltage would then vary from 9V to 14V if we do not account for the droop characteristic, and from perhaps 8.5V to 14V if we do account for the droop.

When the source voltage is between 56V and 100V, the quasi-regulated bus converter would then regulate its output, perhaps with a droop characteristic. In one example, the intermediate voltage would remain constant at 14V (perhaps minus a droop) over this 56V-100V range of source voltage.

With such an approach, the quasi-regulated bus converter keeps the intermediate voltage within a range that is acceptable for typical P.O.L.'s, but it does not try to regulate or semi-regulate the bus voltage to a range as tight as 10% (or so), as the semi-regulated bus converter would. As such, the quasi-regulated converter is capable of achieving an efficiency and power handling capability that is higher than the semi-regulated bus converter.

The exact details of how the source voltage range should be divided between these two modes of operation in the quasi-regulated converter are flexible, and they depend on the design of the converter and on the details of the application.

For instance, the non-regulated mode of operation might be at the high end of the source voltage range instead of the low end, as mentioned in the example above. It might even be in a middle section of the source voltage range, with regulation occurring at either end of the range. The acceptable range of the intermediate voltage might be different than the example given above based on the needs of the P.O.L's or on a desire to optimize the performance of the total system. For instance, the onset of the regulation range might occur in the 50V-52V level, instead of the 56V level mentioned previously.

Provisions for handling start-up and shut-down, and protection features such as over-voltage, over-current, over-temperature, and back-drive current limiting would be added to the quasi-regulated bus converter as required.

A dc-dc converter system may comprise a bus converter that receives a source voltage and converts the source voltage to an output. The bus converter may include a control circuit that normally controls the bus converter to cause a non-regulated mode of operation, over a portion of an operating range of a source voltage, where the output is non-regulated. The control circuit normally causes a regulated mode of operation, over another portion of the operation range of the source voltage, where the output is regulated. A plurality of regulation stages each receive the output of the bus converter and regulate a regulation stage output.

The bus converter may be an isolation stage while the regulation stages are non-isolating. The regulated mode of operation of the bus converter may be a semi-regulated mode. The regulation stages may be switching regulators.

The bus converter may comprise at least one transformer with at least one primary winding and at least one secondary winding. The primary winding circuit receives the source voltage and has an input filter with an input inductor. The secondary winding circuit has plural controlled rectifiers with parallel uncontrolled rectifiers, and output filter having an output inductor and the bus converter output.

For the non-regulated mode of operation, the control circuit may control the duty cycle of the controlled rectifiers to cause substantially uninterrupted flow of power through the dc-dc converter. Each controlled rectifier of the secondary winding circuit may be turned on and off in synchronization with a voltage waveform across a primary transformer winding to provide the output. Each primary winding may have a voltage waveform for the non-regulated mode of operation with a fixed duty cycle and transition times which are short relative to the on state and off state times of the controlled rectifiers.

The bus converter may comprise a filter having an inductor that saturates during a non-regulating mode of operation. Such inductors may be included in an input filter and/or in an output filter.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

Figure 1:
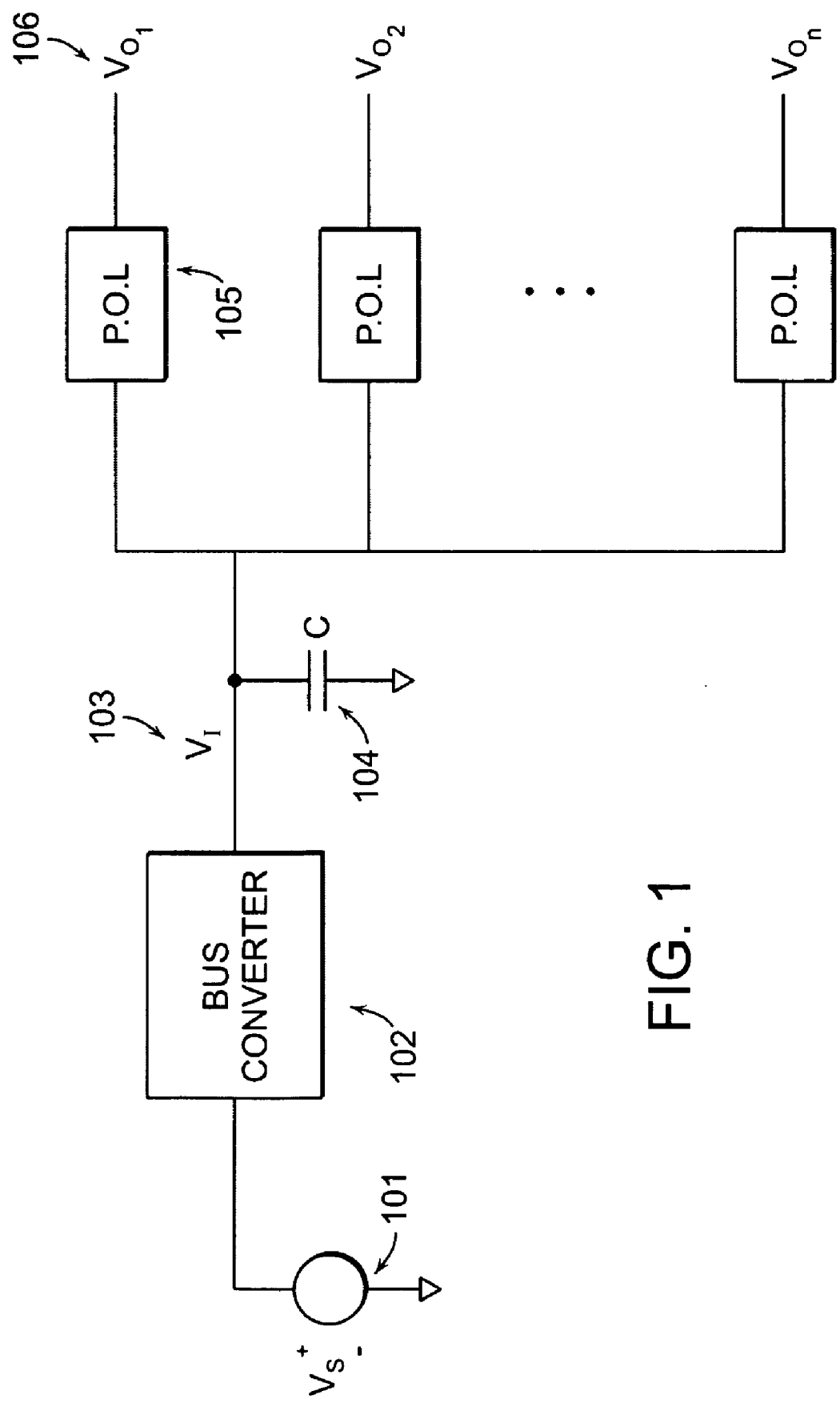
FIG. 1: Block diagram of an Intermediate Bus Architecture (IBA).

FIG. 1 shows a block diagram of an Intermediate Bus Architecture. The source of power 101 provides a dc voltage $V_S$, which may nominally be, for example, 48 volts, but which may vary over a range above and below this nominal, the width of the range being dependent on the application. The bus converter 102 then converts this voltage to a different nominal voltage; for example 12V. It also provides the electrical isolation needed for safety regulations and to avoid ground loop noise problems.

The output of the bus converter provides an intermediate voltage $V_I$ 103. Capacitors 104 are typically connected between this intermediate node and ground to provide additional filtering. Also connected to the intermediate node are the inputs of several non-isolated switching regulators 105, which are called P.O.L.'s. These P.O.L.'s are usually "buck-converters," and in today's technology they often incorporate synchronous rectifiers to improve efficiency. They each create an output voltage 106 that is held constant (i.e. regulated) even as the intermediate voltage or their output current varies. These output voltages are typically supplied to digital and analog load circuitry.

It is also possible for one or more of the P.O.L.'s to be of a design that gives an output voltage higher than the intermediate voltage, or to give an output voltage that is negative with respect to the ground potential. Various topologies such as a "boost-converter," a "buck-boost converter," and a "Sepic converter" could be used for these purposes, and they (and others) are well known in the art.

The bus converter of FIG. 1 could be a non-regulated bus converter, a semi-regulated bus converter, or, as described herein, a "quasi-regulated bus converter." The choice depends, in part, on how much the source voltage varies and on how wide a range of intermediate voltage the P.O.L.s can tolerate. Some sources stay within a relatively tight range; for example 48V±10%. Others vary over a moderate range; for example 36V to 56V. Yet others have a very wide range, for example 36V to 100V. Some P.O.L.'s are designed to handle an input voltage that is relatively tight; for example 12V±20%. Others are designed to handle a wider range; for example 7V to 15V.

Figure 2:
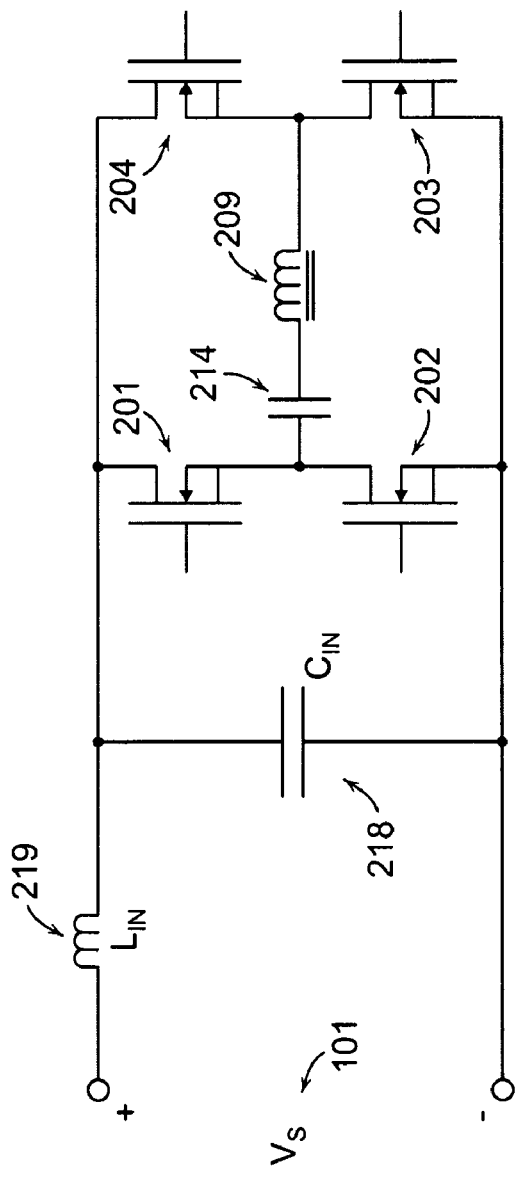
FIG. 2: One example of a Bus Converter power circuit topology which, based on how it is controlled and on the component selection, could be used for all three types of Bus Converters.
Figure 2:
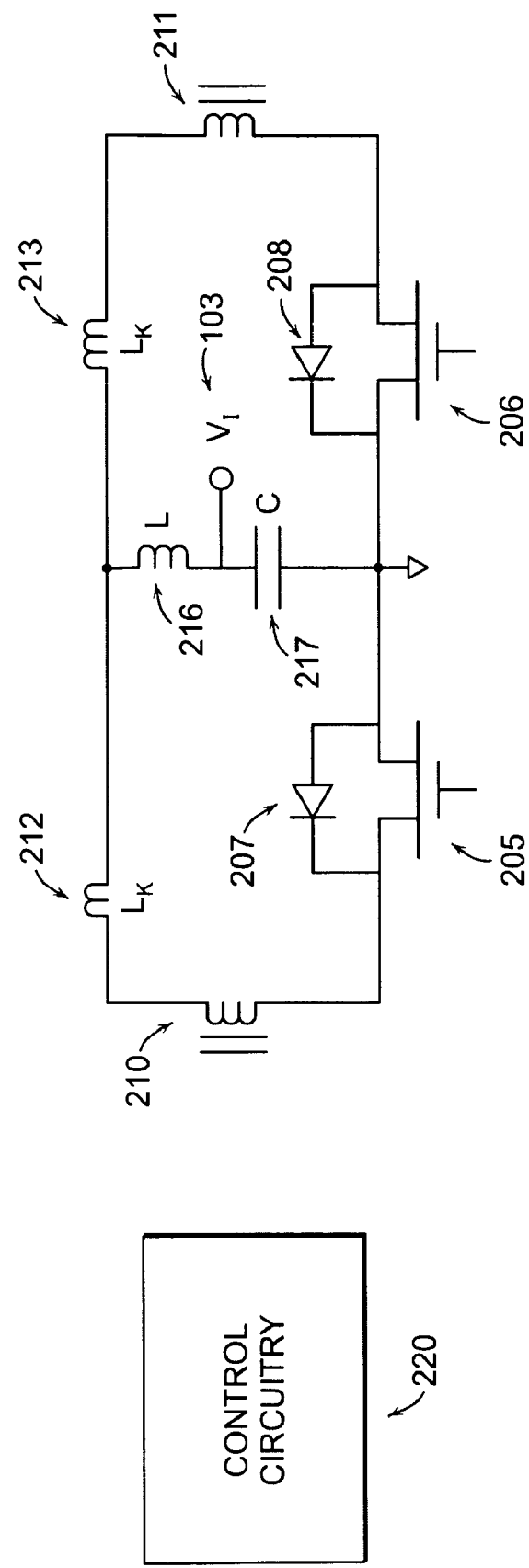

One example of a non-regulated bus converter is described in the '309 patent. As shown in FIG. 2 here, it uses a full-bridge topology for the switches 201-204 connected to the primary winding 209 of the isolation transformer, and a center-tapped topology for the secondary side. Synchronous rectifiers, composed of controlled rectifiers 205 and 206 and their corresponding uncontrolled rectifiers 207 and 208 are connected to the center-tapped secondary windings 210 and 211, respectively. The synchronous rectifiers are typically MOSFETs, where the channel is the controlled rectifier and the parasitic body diode is the uncontrolled rectifier. An external diode could also be used for the uncontrolled rectifier.

A capacitor 214 may be placed in series with the primary winding 209 to ensure flux balance. Other means of achieving flux balance are well known in the art.

Inductors 212 and 213 represent the leakage inductance of the transformer.

Inductor 216 and capacitor 217 form a low-pass output filter. The voltage across capacitor 217 is the intermediate voltage 103 shown in FIG. 1. Capacitor 218 and inductor 219 provide a low-pass filter for the bus converter's input. It may be connected directly to the source voltage 101, or there may be additional filter elements between the two.

A control circuit 220 provides the gate drive signals for the various power switches. It typically senses voltages and currents within the power circuit, and it provides the desired duty cycle/switch timing for the switches.

During normal operation the circuit is operated at a fixed duty cycle where a positive voltage (of value $V_S$) is applied across the transformer's primary winding for the first half of the cycle, and a negative voltage ($-V_S$) is applied across the winding for the second half of the cycle. Except for the relatively short switch transition times between these two half cycles, power is always flowing from the source, through the transformer, and then to the output of the bus converter. Except for the short switch transitions, there is no explicit "freewheeling" portion of the cycle where the power flow through the transformer is interrupted and the flow of power to the output is maintained by the output inductor 216 and capacitor 217 alone.

The synchronous rectifiers in the secondary circuit rectify the output of the transformer and create a dc voltage. This is than passed through the low-pass filter 216,217. The components in this filter, particularly the inductor, are relatively small due to the fact that during normal operation they only need to filter the interruption of power during the short switch transition times at the end of each half-cycle. These interruptions might last only about 50 ns, which is very short compared to the half-cycle, which may be 2 us long, depending on the details of the design.

Consider the case where the source voltage varies over a relatively narrow range from 36V to 56V. Assume the turns-ratio of the transformer is 4:1 (primary to secondary). If there were no load current flowing, the output voltage of the bus converter, $V_I$, would be approximately ¼ that of the source voltage, $V_S$. In other words, $V_I$ would range from 9V to 14V. However, as the load current builds, the $V_I$ falls, or "droops," due to the resistances of the power path and the voltage drops required across the leakage inductances to commutate the current from one secondary winding to the other each half cycle. This droop might typically be about 0.5V at full load current, so the output voltage would range from approximately 8.5V (at full load and $V_S$=36V) to 14V (at zero load and $V_S$=56V).

This non-regulated bus converter can be very efficient (typically 97%) for several reasons, all associated with the fact that it does not normally make use of a freewheeling portion of the cycle to regulate. First, power is transferred from source to output for nearly 100% of the cycle and as a result, the rms value of the current flowing through all the components of the converter is minimized. Second, the turns-ratio of the transformer can be higher than it otherwise would be, so that the currents flowing on the primary side are smaller for a given output current and the off-state voltage ratings of the synchronous rectifiers are smaller for a given maximum source voltage. Third, the switch transitions between one half-cycle and the next are nearly lossless because there is not a need to recover from a freewheeling period. Fourth, the output inductor 216 is relatively small in value, and as a result can be relatively low in losses for a given volume of the device.

In addition, the non-regulated bus converter does not need to have control signals that bridge the isolation barrier between the primary and secondary sides of the circuit. As mentioned in the '417 patent, there is no need to feed back a signal representing the output voltage since there is no attempt to regulate it. There is also no need to send control signals to the synchronous rectifiers. Their control signals can be easily derived from the voltages on the secondary windings, as described in the '309 and the '417 patents. Besides saving cost, this lack of circuitry that bridges the isolation barrier permits the transformer to occupy the entire physical width of the converter, and therefore it can have a lower winding resistance, higher efficiency, and better thermal performance.

During transients such as startup and shutdown, or in situations where the output current must be limited from getting either too high or too negative, the non-regulated bus converter may be operated with a duty cycle less than 100%, and therefore with an associated freewheeling period. For instance, at startup the duty cycle may be slowly ramped from 0% to 100% to cause the output voltage $V_I$ to slowly rise to its final value. As explained in the '309 patent, there are additional losses during these abnormal conditions due to dissipative switch transitions and the fact that the controlled rectifiers may not be conducting during the freewheeling period, depending on the control strategy used. In addition, the output ripple voltage may be larger than normal. But these conditions can be tolerated since they are transient in nature and do not represent the normal use of the non-regulated bus converter.

When the input voltage varies over a range that is too wide to use a non-regulated bus converter with a given P.O.L technology, a semi-regulated bus converter is often used. Such a bus converter could have the same full-bridge topology shown in FIG. 2. The difference is that now the converter is designed to have its duty cycle vary as the source voltage varies so that the intermediate voltage $V_I$ stays near a nominal value. For instance, if the source voltage $V_S$ varies from 36V to 100V, the semi-regulated bus converter might be designed to have a duty cycle near 100% when $V_S$=36V, and a duty cycle of about 36% when $V_S$=100V.

Since it is not necessary, in an IBA application, to have the intermediate bus voltage be fully regulated, a semi-regulated converter is usually designed such that the feedback signal that determines the duty cycle is derived from one or more signals available on the primary side of the converter that are indicative of the output voltage. One possible signal is the source voltage, $V_S$. Another possible signal is the voltage across the primary transformer winding.

These signals do not account for voltage drops across resistances in the power path, nor do they account for the voltage drops across leakage inductances that are required to commutate the load current from one secondary winding to the other. As such, a semi-regulated bus converter will have an output voltage that falls, or droops, as the load current is increased. A droop of 5%-10% is typical as the load current varies from zero to full rated current.

If the droop is larger than desired, then it is possible to reduce it by measuring a signal on the primary side that is indicative of the current flowing through the power stage. This signal, multiplied by an appropriate gain, can be used to modify the duty cycle to give a higher output voltage to compensate for the droop, as described in the '417 patent. Since the resistances of the power path are temperature dependent, it might also be desirable to adjust the effect of this compensation circuitry as a function of the converter's temperature.

A semi-regulated bus converter cannot be as efficient as a non-regulated bus converter, all other things held constant. By definition, it has a freewheeling period for all values of the source voltage except, perhaps, the lowest. It therefore isn't able to fully utilize the transformer and the power switching devices. There is also a significant switching loss at the end of each freewheeling period due to the leakage inductance of the transformer and the parasitic capacitances of the power switches. Third, the transformer's turns ratio would be lowered, which means that the currents on the primary side are higher for a given load current and the off-state ratings of the synchronous rectifiers are higher for a given maximum source voltage. Finally, the output inductor would be made relatively large in value to minimize the ripple in its current and the intermediate voltage. This large value of inductance translates into a physically larger and more dissipative device.

For instance, if the source voltage ranges from 36V to 100V, and the output voltage is to be nominally 12V (not counting the droop), the turns ratio for a semi-regulated bus converter must be 3:1. If the source voltage had been 48V±10% and a non-regulating bus converter were used, it could have a turns ratio of 4:1 to create a nominal 12V output. This difference is significant with regard to the bus converter's efficiency.

The output filter must do much more filtering on the semi-regulated bus converter than it has to on the non-regulated bus converter. Instead of just brief interruptions of power flow during the switch transitions each half cycle, now the output filter must deal with interruptions that last for the duration of the freewheeling period. In general, this means that the output inductor must be much larger in value, peak energy storage, and physical size. As a result, more power is dissipated in this inductor, and there is less room available on the converter for other components.

For example, consider the size of the non-regulated bus converter's filter inductor. During the switch transitions it will see the output voltage across it, but these transitions will last only about 50 ns. In comparison, for the semi-regulated bus converter, the filter inductor will see the output voltage across it for the length of the freewheeling period. In the example given above, the longest freewheeling period is 64% of the cycle when $V_S$ is 100V. If we assume a switching frequency of 250 kHz, or 2 µs for each half cycle, then this maximum freewheeling period would be 1.28 µs long. To maintain the same current ripple in the inductor, the value of inductance would therefore need to be increased by a factor of 25 for the semi-regulated bus converter as compared to the non-regulated bus converter. This increase is so large that a more reasonable design might call for more inductor ripple current (to limit the size of the inductor) and more output capacitor to achieve the required ripple level in $V_I$.

Overall, holding all other things constant, a semi-regulated bus converter that must handle a wide range of source voltage might be 94% efficient, while a non-regulated bus converter that is designed to handle a narrower range of source voltage might be 97% efficient. This difference translates into about twice the dissipated power for the former compared to the latter, and therefore results in a lower power handling capability for the semi-regulated bus converter.

An alternate approach, newly described here, is the quasi-regulated bus converter. As mentioned earlier, this bus converter operates as a non-regulated bus converter over a portion of the range of the source voltage, but then regulates its output over the rest of the range. In general, when the quasi-regulated converter is regulating its output, it may do so with or without a droop characteristic.

Figure 3A:
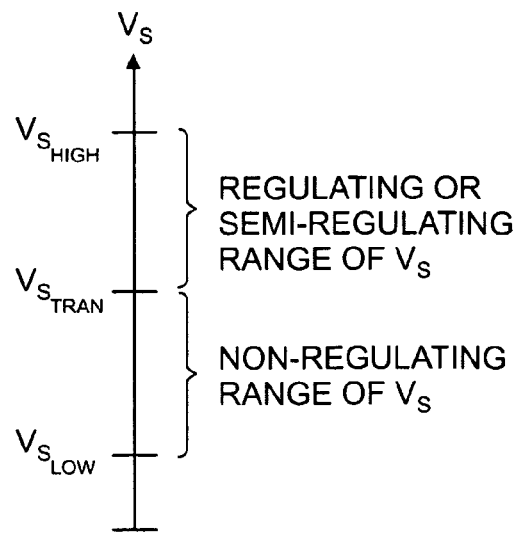
FIGS. 3A-C: Three possible ways to divide the total range of $V_S$ into non-regulating and (semi-)regulating regions.
Figure 3B:
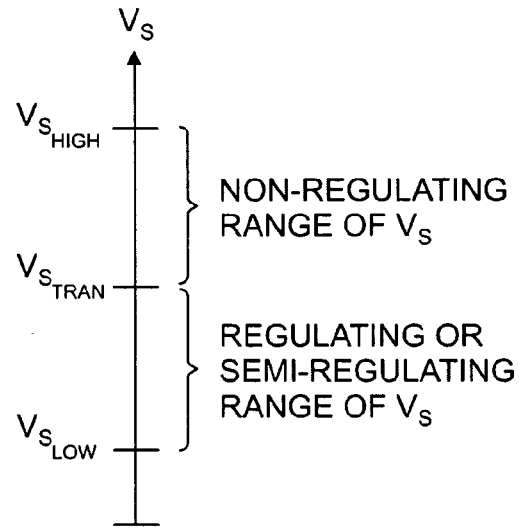
Figure 3C:
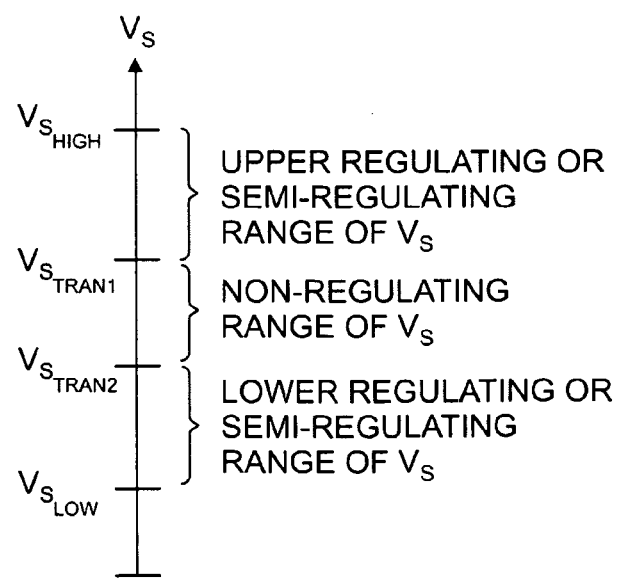

The portion of the source range over which the bus converter is non-regulating may be the low end of the range, the high end of the range, or some other portion, as depicted in FIG. 3, depending on the design of the converter. FIG. 3a depicts the case where the non-regulating range is at the lower end of the total range of $V_S$. FIG. 3b depicts the case where the non-regulating range is at the higher end. And FIG. 3c depicts the case where the non-regulating range is in the middle of the total range of $V_S$.

As one example, a quasi-regulated bus converter could have the same full-bridge topology shown in FIG. 2. Since this topology is inherently a down-converter when it is regulating, the converter would be designed to be non-regulating over the lower end of the source range, and then regulating, or semi-regulating, over the higher end of the range.

Assume the source voltage ranges from 36V to 100V and that the P.O.L.'s can tolerate an intermediate voltage that varies between 7V and 15V. If the transformer is given a turns-ratio of 4:1, then when the quasi-regulated bus converter is operated in a non-regulating manner where its duty cycle is nearly 100% (except for the short switch transitions), the intermediate voltage $V_I$ will be approximately ¼ that of the source voltage $V_S$, minus the droop. Assume that this mode of operation exists whenever the source voltage is in the 36V to 56V range. This would result in an output voltage that varies from 9V to 14V at zero bus converter output current. If we consider the droop, the output voltage might vary from 8.5V to 14V over the full range of source voltage and bus converter output current. This range can be handled by the P.O.L.'s mentioned above with appropriate margins at both ends of the range.

Once the source voltage gets above 56V, the control circuit 220 of the quasi-regulated bus converter will reduce the duty cycle appropriately to keep the output voltage from rising any higher than, say, 14V. The control strategy during this range of source voltage could be the same as is used in the semi-regulating bus converter, in which case the output voltage will display a droop characteristic in this mode of operation, as well. Just as for the semi-regulated bus converter, this droop could be reduced by making use of a signal indicative of current (and of temperature, for further accuracy). Or the control strategy could, if desired, create a tightly regulated output by feeding back a signal from the output. The former approach is simpler, cheaper, and all that is needed for many IBA applications.

The advantages gained by using the quasi-regulated bus converter approach instead of the semi-regulated bus converter are several. First, the turns-ratio of the transformer is 4:1 instead of 3:1. This reduces both the current levels in the primary side of the circuit and the voltage stresses on the secondary side by 25%.

Second, the maximum freewheeling period will be only 44% of the half-cycle period for this example of the quasi-regulated bus converter, as compared to a 64% value for the corresponding semi-regulated bus converter. This permits the output inductor to be reduced by approximately 33% in value.

Because $V_I$ can go as low as 9V for the example given above, the output inductor of the quasi-regulated bus converter must carry a higher maximum dc current than does the inductor in the semi-regulated bus converter whose output voltage remains at 12V (ignoring droop in both cases). For instance, if we assume the output power of the bus converter is 240 W, the quasi-regulated bus converter's inductor would have to carry a dc current of 27 A; whereas, the semi-regulated bus converter's inductor would have to carry only 20 A. This would appear to require that the inductor of the quasi-regulated bus converter be designed to store much more peak energy, even though its inductance value is smaller.

However, it is possible to let the quasi-regulated bus converter's inductor saturate at the higher current levels associated with $V_S$ below 56V and $V_I$ therefore falling below 14V (again, ignoring droop) since for that condition, the converter is being operated at nearly 100% duty cycle and very little output inductance is therefore required. The residual inductance that remains after the core saturates will typically be sufficient. Doing this makes the quasi-regulated bus converter's output inductor much smaller than can be achieved with the semi-regulated bus converter.

Similarly, the input filter inductor 219 could be made physically smaller by allowing it to saturate when $V_S$ is low enough such that that quasi-regulated bus converter is operating at nearly 100% duty cycle. In this condition there is much less ripple caused at the input compared to when there is a freewheeling period, and so less input filter inductance is needed.

An additional advantage of the quasi-regulated bus converter is the fact that it avoids the switching losses of recovering from a freewheeling period over a significant portion of the range of the source voltage. For instance, in the example given above, when $V_S$ is low and the currents are therefore relatively high, the quasi-regulated bus converter is operating with nearly 100% duty cycle, which keeps the switching losses small just when the conduction losses are at their highest. At higher values of $V_S$, when the duty cycle is reduced below 100% and the switching losses increase, the currents are then lower so that the conduction losses are smaller. Overall, the total dissipation in the semiconductor devices is reduced compared to the semi-regulated bus converter for any given operating point.

Overall, holding all other things constant, a quasi-regulated bus converter able to handle a source voltage range of 36V to 100V will be about 96% efficient, as compared to a semi-regulated bus converter which would be only 94% efficient. This results in only two-thirds the power dissipation for the same output power, and will permit a higher power density capability.

The description of the quasi-regulated bus converter presented above has been based on a power circuit topology that is an isolated down-converter. It is also possible to base a quasi-regulated bus converter on a topology that is an isolated up-converter, such as a center-tapped, push-pull topology. For this topology, the control strategy might be to maintain 100% duty cycle for the high end of the source voltage, and then reduce the duty cycle (and therefore increase the output voltage) when the source voltage is at the lower end of its range.

Similarly, one skilled in the art could configure a quasi-regulated bus converter based on an isolated up-down converter. For this topology the control strategy might be to maintain 100% duty cycle for the middle portion of the range of the source voltage, and then regulate at both the low and the high end of the range.

While this invention has been particularly shown and described with references to preferred embodiments thereof, it will be understood by those skilled in the art that various changes in form and details may be made therein without departing from the spirit and scope of the invention as defined by the appended claims. Those skilled in the art will recognize or be able to ascertain using no more than routine experimentation many equivalents to the specific embodiments of the invention described specifically herein. Such equivalents are intended to be encompassed in the scope of the claims. For instance, other topologies besides the full-bridge topology, such as the half-bridge topology and others known in the art could be used. In addition, the ideas presented above for isolated bus converters could also be used for bus converters based on non-isolated power circuit topologies.

The invention claimed is:

1. A dc-dc converter system comprising:
    a bus converter that receives a source voltage and converts the source voltage to an output and that includes a control circuit that normally controls the bus converter to cause:
        a non-regulated mode of operation, over a portion of an operating range of the source voltage, where the output is non-regulated; and
        a regulated mode of operation, over another portion of the operating range of the source voltage, where the output is regulated; and
    a plurality of regulation stages, each receiving the output of the bus converter and regulating a regulation stage output.

2. A dc-dc converter system as claimed in claim 1 wherein the bus converter is an isolation stage and the regulation stages are non-isolating.

3. A dc-dc converter system as claimed in claim 2 wherein the regulated mode of operation of the bus converter is a semi-regulated mode.

4. A dc-dc converter system as claimed in claim 2 wherein the regulation stages are switching regulators.

5. A dc-dc converter system as claimed in claim 1 wherein the regulated mode of operation of the bus converter is a semi-regulated mode.

6. A dc-dc converter system as claimed in claim 1 wherein the bus converter comprises:
    at least one transformer with at least one primary winding and at least one secondary winding;
    a primary winding circuit that received the source voltage and has an input filter with an input inductor; and
    a secondary winding circuit having plural controlled rectifiers with parallel uncontrolled rectifiers, an output filter having an output inductor and the output.

7. A dc-dc converter system as claimed in claim 6 wherein, for the non-regulated mode of operation, the control circuit controls the duty cycle of the controlled rectifiers to cause substantially uninterrupted flow of power through the dc-dc converter.

8. A dc-dc converter system as claimed in claim 6 wherein each controlled rectifier is turned on and off in synchronization with a voltage waveform across a primary transformer winding to provide the output, each primary winding having a voltage waveform for the non-regulated mode of operation with a fixed duty cycle and transition times which are short relative to the on state and off state times of the controlled rectifiers.

9. A dc-dc converter system as claimed in claim 8 further comprising a filter having an inductor that saturates during the non-regulated mode of operation.

10. A dc-dc converter system as claimed in claim 8 further comprising an output filter having an inductor that saturates during the non-regulated mode of operation.

11. A dc-dc converter system as claimed in claim 1 further comprising a filter having an inductor that saturates during the non-regulated mode of operation.

12. A dc-dc converter system as claimed in claim 1 further comprising an output filter having an inductor that saturates during the non-regulated mode of operation.

13. A dc-dc converter system as claimed in claim 1 wherein the non-regulating mode of operation is over a lower portion of the operating range and the regulated mode of operation is over an upper portion of the operating range.

14. A dc-dc converter that receives a source voltage and converts it to an output comprising:
    a power circuit comprising:
        at least one transformer having at least one primary winding and at least one secondary winding;
        a primary winding circuit that receives the source voltage and has an input filter with an input inductor; and
        a secondary winding circuit having plural controlled rectifiers with parallel uncontrolled rectifiers, an output filter having an output inductor and the output; and
    a control circuit that normally controls the power circuit to cause a non-regulated mode of operation, over a portion of an operating range of the source voltage, where the output is non-regulated, and to cause a regulated mode of operation, over another portion of the operating range of the source voltage, where the output is regulated.

15. A dc-dc converter as claimed in claim 14, wherein the regulated mode of operation is a semi-regulated mode.

16. A dc-dc converter as claimed in claim 14 wherein the primary winding circuit is isolated from the secondary winding circuit.

17. A dc-dc converter as claimed in claim 16 wherein the regulated mode of operation is a semi-regulated mode.

18. A dc-dc converter as claimed in claim 14 wherein, for the non-regulated mode of operation, the control circuit controls the duty cycle of the controlled rectifiers to cause substantially uninterrupted flow of power through the dc-dc converter.

19. A dc-dc converter as claimed in claim 14 wherein each controlled rectifier is turned on and off in synchronization with a voltage waveform across a primary transformer winding to provide the output, each primary winding having a voltage waveform for the non-regulated mode of operation with a fixed duty cycle and transition times which are short relative to the on state and off state times of the controlled rectifiers.

20. A dc-dc converter as claimed in claim 19 further comprising a filter having an inductor that saturates during the non-regulated mode of operation.

21. A dc-dc converter as claimed in claim 19 further comprising an output filter having an inductor that saturates during the non-regulated mode of operation.

22. A dc-dc converter as claimed in claim 14 further comprising a filter having an inductor that saturates during the non-regulated mode of operation.

23. A dc-dc converter as claimed in claim 14 further comprising an output filter having an inductor that saturates during the non-regulated mode of operation.

24. A method of dc-dc power conversion comprising:
applying a source voltage to a bus converter and converting the source voltage to an output, and controlling the bus converter to cause a non-regulated mode of operation, over a portion of an operating range of the source voltage, where the output is regulated and a regulated mode of operation, over another portion of the operating range of the source voltage, where the output is regulated; and
further regulating the bus converter output through a plurality of non-isolating switching regulators.

25. A method of dc-dc power conversion comprising:
applying a source voltage through an input filter having an input inductor in a primary transformer winding circuit;
applying power from the primary winding circuit through at least one transformer to a secondary transformer winding circuit;
in the secondary transformer winding circuit switching plural controlled rectifiers, each having a parallel uncontrolled rectifier, to apply an output through an output filter having an output inductor; and
controlling the circuits to cause a non-regulated mode of operation, over a portion of an operating range of the source voltage, where the output is non-regulated and a regulated mode of operation, over another portion of the operating range of the source voltage, where the output is regulated.

26. A dc-dc converter system as claimed in claim 1 wherein, in the regulated mode of operation, the output of the bus converter does not vary with the source voltage.

27. A dc-dc converter as claimed in claim 14 wherein, in the regulated mode of operation, the output does not vary with the source voltage.

* * * * *

UNITED STATES PATENT AND TRADEMARK OFFICE
CERTIFICATE OF CORRECTION

| | | |
|---|---|---|
| PATENT NO. | : 7,787,261 B2 | Page 1 of 1 |
| APPLICATION NO. | : 11/982327 | |
| DATED | : August 31, 2010 | |
| INVENTOR(S) | : Farrington et al. | |

It is certified that error appears in the above-identified patent and that said Letters Patent is hereby corrected as shown below:

In the Claims:

In Column 11, Claim 24, line 23, after "where the output is" delete the first occurrence of "regulated" and insert --non-regulated--, so that the full line reads --age, where the output is non-regulated and a regulated mode--.

Signed and Sealed this
Twenty-third Day of July, 2013

Teresa Stanek Rea
*Acting Director of the United States Patent and Trademark Office*